April 7, 1953
J. BOMMELAER
2,633,755
ADJUSTING DEVICE OF THE DRIVE OF ENGRAVED ROLLERS
IN ROTARY MACHINES FOR THE PRINTING
OF TEXTILES AND THE LIKE
Filed April 17, 1952
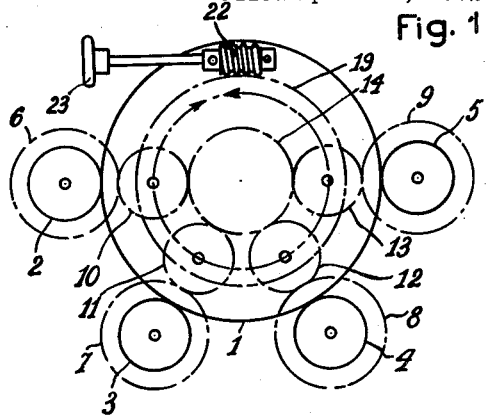
Fig. 1
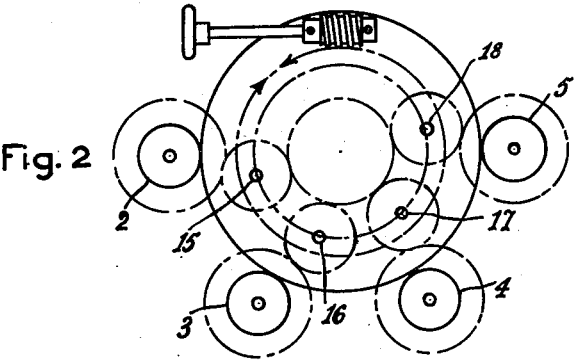
Fig. 2
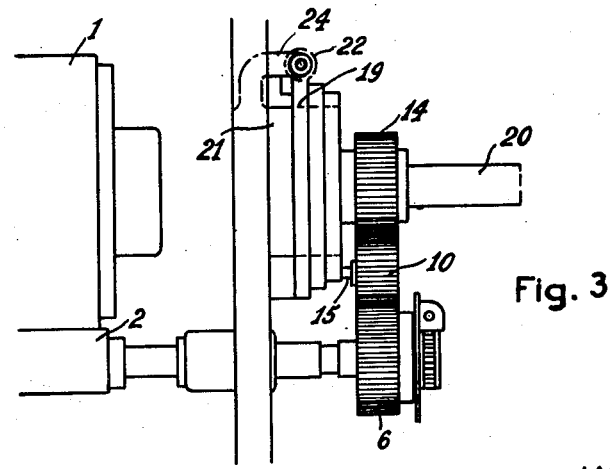
Fig. 3
INVENTOR
JEAN BOMMELAER
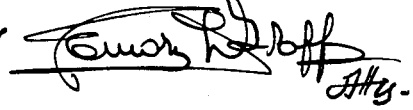

Patented Apr. 7, 1953

2,633,755

UNITED STATES PATENT OFFICE 2,633,755

ADJUSTING DEVICE OF THE DRIVE OF ENGRAVED ROLLERS IN ROTARY MACHINES FOR THE PRINTING OF TEXTILES AND THE LIKE

Jean Bommelaer, Paris, France, assignor to Société Alsacienne de Constructions Mécaniques, Mulhouse, France, a corporation of France Application April 17, 1952, Serial No. 282,816
In France May 28, 1951

1 Claim. (Cl. 74—397)

The drive of the printing rollers is generally effected by means of a large central wheel keyed on the rotary shaft carrying the presser and placed on the side of one of the side cheeks of the support of the printing machine. This central wheel actuates the whole group of inserted wheels keyed on the spindle ends on which the printing rollers are fixed, which are placed about the presser roller.

Owing to the variation in the circumference of the rollers after changing the design or wear of the engraving, the distance of the spindles of the rollers varies relatively to that of the presser and it is no longer possible to effect a correct meshing of the inserted wheels with the large central wheel.

The different inclinations of the printing rollers relatively to the presser roller which the operator is forced to take into account in many cases, cause the sides of the teeth and the central wheel to wear out very rapidly, often owing to this necessitating the replacement of the inserted wheels, thus ending in very heavy maintenance costs.

The present invention has for its object, the elimination of these drawbacks by means of a driving device comprising a central wheel of small dimensions with planet gears, enabling:

(1) The theoretical meshing of the inserted wheels in their pitch diameters, (2) The use of a single set of inserted wheels for the rollers with normal diameters.

It presents the added advantage of including inserted wheels of normal construction, comprising a safety device for the printer made by means of a disc larger than the outer diameter of the teeth of the inserted wheel.

A method of embodiment of the invention is represented diagrammatically and by way of example, on the accompanying drawing, in which:

Fig. 1 is an elevational view showing the meshing of the inserted wheels and planet wheels for the maximum circumference possible of the engraved roller;

Fig. 2 shows a similar view, but with a smaller circumference of the engraved roller, the differential pinions having operated in this case, a slight rotation about the central spindle;

Fig. 3 is a cross-section showing the meshing of the pinions.

In the drawing, 1 designates the central presser roller, 2, 3, 4, 5 the different engraved rollers (which number four only in the case of the method of embodiment described by way of example), 6, 7, 8, 9 the inserted wheels driving these engraved rollers and 10, 11, 12, 13 the differential pinions corresponding to each of the inserted wheels. The central driving wheel is designated by 14, the spindles of the differential pinions by 15, 16, 17, 18, the rim forming worm wheel and carrying the spindles of the planet-wheels is designated by 19, the central driving shaft by 20, the support of the central shaft and the rim, fixed on the side of a support by 21, the worm by 22 with, in 23, its operating hand wheel, and the the support holding up the worm by 24.

When the machine is running, the movement is transmitted through the medium of the central shaft 20 and the central wheel 14 to each of the differential pinions 10, 11, 12, 13 mounted loose about their spindles 15, 16, 17, 18. These differential wheels themselves transmit to each of the inserted wheels 6, 7, 8, 9, themselves driving the engraved rollers 2, 3, 4, 5. It being presumed that the rollers are in position with their inserted wheel, the operating hand wheel 23 and the worm 22 will simply have to be worked so as to turn rim 19 in one direction or the other to effect the meshing of all the differential pinions 10, 11, 12 and 13 with their corresponding inserted wheels 6, 7, 8 and 9. The adjusting of these inserted wheels to enable carrying out the exact superposition of the designs, may be done either by an ordinary system of wheel and worm, or through the medium of an auxiliary motor, or even by any other suitable manner.

Thus, the wear of the inserted wheels being considerably less owing to the fact of the better meshing of same with the driving differential pinions, a more uniform drive results therefrom of the printing rollers, a more normal running of the machine and a considerable reduction in maintenance costs.

What I claim is:

Adjusting device of the drive of engraved rollers in rotary machines for the printing of textiles and the like characterized by the fact that it includes a central driving shaft, a central wheel driven by the central shaft, engraved rollers distributed about the central wheel and driven by the latter through the medium of differential pinions whose number corresponds to that of the engraved rollers and each of which mesh on the one hand with the central wheel and, on the other, with an inserted wheel driving the corresponding engraved roller, a rim which is concentric to the shaft of the central wheel and which carries the spindles of the aforementioned differential pinions which are mounted loose on these spindles, a worm which turns the aforementioned rim in one direction or the other, and an operating hand wheel for the worm, the central shaft and the rim being mounted on a common support fixed on the side of a column of the machine and the worm itself being mounted on a support fixed on this column, the rotation of the aforementioned rim in one direction or the other by working the worm enabling the meshing of all the differential pinions with the inserted wheels of the corresponding engraved rollers.

JEAN BOMMELAER.

No references cited.